United States Patent
Fukuda et al.

(10) Patent No.: US 9,067,415 B2
(45) Date of Patent: *Jun. 30, 2015

(54) INK-JET RECORDING APPARATUS

(71) Applicant: Seiko Epson Corporation, Tokyo (JP)

(72) Inventors: Masako Fukuda, Shiojiri (JP); Keiji Matsumoto, Matsumoto (JP); Masato Murayama, Matsumoto (JP); Hiroshi Mukai, Shiojiri (JP); Keiichiro Yoshino, Matsumoto (JP); Hiroki Nakane, Matsumoto (JP); Akira Shinoto, Shimosuwa (JP); Toshihiko Wakabayashi, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,087

(22) Filed: Oct. 30, 2013

(65) Prior Publication Data
US 2014/0152739 A1 Jun. 5, 2014

(30) Foreign Application Priority Data

Nov. 30, 2012 (JP) ................................. 2012-262110
Nov. 30, 2012 (JP) ................................. 2012-262119

(51) Int. Cl.
*B41J 2/165* (2006.01)
*C09D 11/322* (2014.01)

(52) U.S. Cl.
CPC .......... *B41J 2/16505* (2013.01); *B41J 2/16535* (2013.01); *B41J 2/16552* (2013.01); *C09D 11/322* (2013.01); *B41J 2002/16558* (2013.01)

(58) Field of Classification Search
USPC ........... 347/21, 22, 28, 29, 31, 32, 33, 34, 45, 347/46, 100
See application file for complete search history.

(56) References Cited

U.S. PATENT DOCUMENTS 6,460,968 B1  10/2002  Chee et al.
7,090,728 B2  8/2006  Nakamura
(Continued)

FOREIGN PATENT DOCUMENTS

EP  0 914 951 A1  5/1999
JP  2000-158647 A  6/2000
(Continued)

OTHER PUBLICATIONS

Extended European Search Report for Application No. EP 13 19 3174 dated Mar. 5, 2014 (6 pages).
(Continued)

*Primary Examiner* — Anh T. N. Vo
(74) *Attorney, Agent, or Firm* — Harness, Dickey & Pierce, P.L.C.

(57) ABSTRACT

An ink-jet recording apparatus includes a recording head having a plurality of nozzles through which an ink composition containing an inorganic pigment is ejected, a nozzle surface having nozzle orifices, and a liquid-repellent film disposed on the nozzle surface; an absorbing member that absorbs the ink composition from the nozzle orifices and the nozzle surface; and an actuating mechanism including a pressing member that presses the absorbing member and the nozzle surface relative to each other with a force of 50 to 500 gf. The actuating mechanism moves at least one of the absorbing member and the recording head relative to the other to perform a cleaning operation in which the ink composition is removed from the nozzle surface with the absorbing member. The absorbing member contains an impregnation liquid during the cleaning operation.

15 Claims, 6 Drawing Sheets

(56) References Cited

U.S. PATENT DOCUMENTS

| | | | |
|---|---|---|---|
| 7,114,793 B2* | 10/2006 | Katsuta et al. | 347/22 |
| 7,210,763 B2 | 5/2007 | Kato et al. | |
| 7,264,329 B2 | 9/2007 | Kato et al. | |
| 7,673,964 B2 | 3/2010 | Furukawa | |
| 8,100,504 B2* | 1/2012 | Yokohama et al. | 347/47 |
| 8,157,349 B2 | 4/2012 | Sanada et al. | |
| 8,282,191 B2* | 10/2012 | Yoda et al. | 347/33 |
| 8,328,343 B2* | 12/2012 | Aruga et al. | 347/100 |
| 2002/0109745 A1 | 8/2002 | Barinaga | |
| 2008/0038324 A1 | 2/2008 | Itoh et al. | |
| 2009/0009556 A1 | 1/2009 | Takahashi et al. | |
| 2009/0219335 A1 | 9/2009 | Furukawa | |
| 2010/0315463 A1 | 12/2010 | Escude et al. | |
| 2014/0085376 A1 | 3/2014 | Kato et al. | |

FOREIGN PATENT DOCUMENTS

| | | |
|---|---|---|
| JP | 2002-019133 A | 1/2002 |
| JP | 2003-270423 A | 9/2003 |
| JP | 2005-096212 A | 4/2005 |
| JP | 2005-096214 A | 4/2005 |
| JP | 2005-161870 A | 6/2005 |
| JP | 2005-342275 A | 12/2005 |
| JP | 2006-142804 A | 6/2006 |
| JP | 2006-205713 A | 8/2006 |
| JP | 2008-229962 A | 10/2008 |
| JP | 2009-029047 A | 2/2009 |
| JP | 2009-101630 A | 5/2009 |
| JP | 2009-274258 A | 11/2009 |
| JP | 2010-031402 A | 2/2010 |
| JP | 4424954 B2 | 3/2010 |
| JP | 2010-168433 A | 8/2010 |
| WO | WO-2010050618 A1 | 5/2010 |
| WO | WO-2010-139713 A1 | 12/2010 |
| WO | WO-2011007888 A1 | 1/2011 |
| WO | WO-2011-099230 A1 | 8/2011 |
| WO | WO-2012-117742 A1 | 9/2012 |

OTHER PUBLICATIONS

Extended European Search Report for Application No. EP 13 19 3175 dated Mar. 4, 2014 (6 pages).
International Search Report for International Application No. PCT/JP2012/001447 mailed Mar. 27, 2012 (4 pages).
Extended European Search Report for Application No. EP 13 19 3177 dated Mar. 4, 2014 (6 pages).

* cited by examiner

INK-JET RECORDING APPARATUS

Priority is claimed under 35 U.S.C. §119 to Japanese Application No. 2012-262110 filed on Nov. 30, 2012 and No. 2012-262119 filed on Nov. 30, 2012, are hereby incorporated by reference in its entirety.

BACKGROUND

1. Technical Field

The present invention relates to ink-jet recording apparatuses.

2. Related Art

In ink-jet recording, ink droplets are propelled onto a recording medium such as paper to produce a print. Recent revolutionary advances in ink-jet recording technology have enabled the use of ink-jet recording apparatuses in the field of high-resolution image recording (image printing), where photography and offset printing have so far been used.

In an ink-jet recording apparatus, ejected ink increases in viscosity (thickens) as water and other volatile components evaporate therefrom. Such thickened ink clogs nozzles, which causes problems with ejection of ink. In recent ink-jet recording, ink droplets are ejected in extremely small amounts, i.e., several picoliters, for high-resolution recording. Accordingly, ink is ejected from smaller nozzles with lower energy. Because of the smaller nozzles and the lower ejection energy, nozzle clogging has a greater impact on ejection of ink. In addition, bubbles may enter the nozzles and ink supply channels, which causes problems with ejection. Furthermore, in ink-jet recording on recording media such as paper and fabric, large amounts of fiber and paper dust are produced during paper feed operation. These substances, as well as ambient dust and extremely small ink droplets occurring during ejection, may be deposited on a surface of an ink ejection print head in which nozzles are formed (hereinafter referred to as "nozzle surface"). If foreign matter such as ink, paper dust, fiber, and ambient dust is deposited on and around the nozzles, it blocks normal ejection of ink.

To reduce or eliminate problems with ejection due to ink thickening, entry of bubbles, and deposition of foreign matter on the nozzle surface, ink-jet recording apparatuses having a wiper mechanism (recovery mechanism) have been proposed.

For example, JP-A-2006-142804 discloses an ink-jet recording apparatus having a cleaning mechanism including a wiping blade. This reference discloses that fine particles are distributed over the surface of the wiping blade to reduce the friction coefficient between the wiping blade and the head, thereby protecting the nozzle surface.

As a compact, low-cost ink-jet recording apparatus with high weatherability, durability, and reliability, JP-A-2009-101630 discloses an ink-jet recording apparatus including an applying unit that applies a treatment liquid to a recording head or a wiper member.

However, the wiping blade disclosed in JPA-2006-142804 provides poor cleaning performance when used to clean a stepped nozzle surface. Specifically, when the wiping blade is used to clean a stepped nozzle surface formed by a nozzle plate and a nozzle plate cover, the wiping blade is moved while scraping off ink outward from the center of the blade. Although the wiping blade leaves no ink near the nozzles, ink builds up around the wiping blade. In particular, scraped ink builds up at the step between the nozzle plate and the nozzle plate cover. Such ink build-up grows and eventually interferes with the lip surface of the cap, which prevents tight capping. For an ink-jet recording apparatus configured for recording with an ink containing an inorganic pigment (hereinafter referred to as "inorganic-pigment containing ink composition"), simply using a treatment liquid as disclosed in JP-A-2009-101630 results in damage to a liquid-repellent film due to the inorganic pigment during cleaning and poor cleaning performance. In addition, the treatment liquid enters the nozzles together with bubbles and aggregates the pigment, which causes problems with ejection, and the liquid-repellent film cannot be sufficiently protected because the pressing force is not considered. Damage to the liquid-repellent film results in unstable ejection of ink, which causes problems such as irregular dot landing.

SUMMARY

An advantage of some aspects of the invention is that it provides an ink-jet recording apparatus that allows both high cleaning performance and good conservation of a liquid-repellent film in recording with an inorganic-pigment containing ink composition.

After conducting extensive research, the inventors have found that the use of an absorbing member, such as fabric, that allows inorganic pigment particles to permeate into the absorbing member and that contains an impregnation liquid as a wiping member to clean (wipe) a nozzle surface of an ink-jet printer with a predetermined pressing force allows foreign matter such as ink mist, dust, and fabric fiber to be efficiently removed from the nozzle surface while preventing inorganic pigment particles from damaging a liquid-repellent film on the nozzle surface. These findings have led to the invention.

According to an aspect of the invention, there is provided an ink-jet recording apparatus including a recording head having a plurality of nozzles through which an ink composition containing an inorganic pigment is ejected, a nozzle surface having nozzle orifices, and a liquid-repellent film disposed on the nozzle surface; an absorbing member that absorbs the ink composition from the nozzle orifices and the nozzle surface; and an actuating mechanism including a pressing member that presses the absorbing member and the nozzle surface relative to each other with a force of 50 to 500 gf. The actuating mechanism moves at least one of the absorbing member and the recording head relative to the other to perform a cleaning operation in which the ink composition is removed from the nozzle surface with the absorbing member. The absorbing member contains an impregnation liquid during the cleaning operation.

It is preferable that the ink composition containing the inorganic pigment further contain a resin emulsion.

It is preferable that the recording head further have a nozzle plate cover disposed on the nozzle surface so as to at least partially cover the nozzle surface.

It is preferable that the actuating mechanism move at least one of the absorbing member and the recording head relative to the other at a speed of 1 to 10 cm/s.

It is preferable that the ink-jet recording apparatus further include an elastic member that covers the pressing member and that has a Shore A hardness of 10 to 60.

It is preferable that the nozzle surface have a first row of nozzles through which the ink composition containing the inorganic pigment is ejected and a second row of nozzles through which an ink composition containing a colorant other than the inorganic pigment is ejected and that the actuating mechanism move the absorbing member and the recording head relative to each other in a direction in which the nozzles are arranged.

It is preferable that the liquid-repellent film have a thickness of 1 to 30 nm.

It is preferable that the inorganic pigment have an average particle size of 200 nm or more and a Mohs hardness of more than 2.0.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
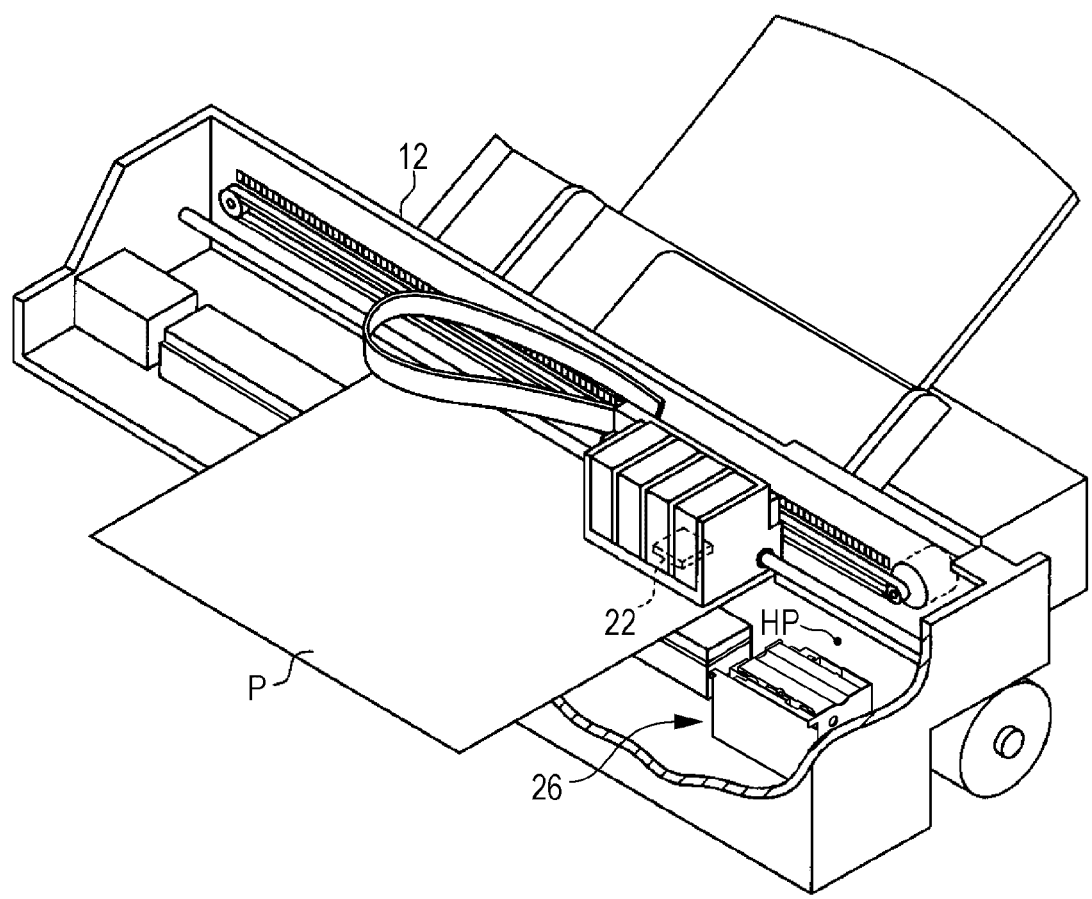
FIG. 1 is a perspective view of an ink-jet recording apparatus according to an embodiment of the invention.

Embodiments of the invention will now be described in detail. The invention, however, is not limited to these embodiments; various modifications are possible without departing from the spirit of the invention.

Ink-Jet Recording Apparatus

An ink-jet recording apparatus according to an embodiment of the invention includes a recording head, an absorbing member, and an actuating mechanism. The recording head has a plurality of nozzles through which an inorganic-pigment containing ink composition is ejected, a nozzle surface having nozzle orifices, and a liquid-repellent film disposed on the nozzle surface. The absorbing member absorbs the inorganic-pigment containing ink composition from the nozzle orifices and the nozzle surface. The actuating mechanism includes a pressing member that presses the absorbing member and the nozzle surface relative to each other with a force of 50 to 500 gf. The actuating mechanism moves at least one of the absorbing member and the recording head relative to the other to perform a cleaning operation in which the ink composition is removed from the nozzle surface with the absorbing member. The absorbing member contains an impregnation liquid during the cleaning operation.

1. Structure of Apparatus 1-1. Recording Head

The recording head according to this embodiment has a nozzle surface having a plurality of nozzles through which an inorganic-pigment containing ink composition is ejected and a liquid-repellent film disposed on the nozzle surface.

Nozzle Surface

The nozzle surface may be any surface having a plurality of nozzles through which an inorganic-pigment containing ink composition is ejected. The nozzle surface may have a first row of nozzles through which the inorganic-pigment containing ink composition is ejected and a second row of nozzles through which an ink composition containing a colorant other than inorganic pigments (hereinafter referred to as "inorganic-pigment-free ink composition") is ejected. In this case, it is preferable that the actuating mechanism, described later, move the absorbing member and the recording head relative to each other in the direction in which the nozzles are arranged in rows and that the first and second rows of nozzles be cleaned with different portions of the absorbing member. This prevents the second row of nozzles from being cleaned with a portion of the absorbing member on which the inorganic-pigment containing ink composition ejected from the first row of nozzles is deposited. Thus, the inorganic pigment, which tends to degrade the liquid-repellent film, does not spread to the second row of nozzles and degrade the liquid-repellent film near the second row of nozzles. That is, the liquid-repellent film is not extensively degraded. In the cleaning operation, the second row of nozzles may be cleaned after the first row of nozzles is cleaned, or the two rows of nozzles may be simultaneously cleaned. Preferably, the two rows of nozzles are simultaneously cleaned for increased cleaning efficiency. If the feature discussed in this paragraph is employed, the absorbing member need not contain an impregnation liquid.

Liquid-Repellent Film

The liquid-repellent film is disposed on the nozzle surface. The liquid-repellent film may be any film with liquid repellency. For example, the liquid-repellent film may be formed by depositing, drying, and annealing a metal alkoxide molecular film with liquid repellency. The metal alkoxide molecular film may be any metal alkoxide molecular film with liquid repellency. Preferably, the metal alkoxide molecular film is a monomolecular film of a metal alkoxide having a fluorine-containing long-chain polymer group (long-chain RF group) or a monomolecular film of a metal acid salt having a liquid-repellent group (e.g., a fluorine-containing long-chain polymer group). Typical examples of metals in such metal alkoxides include, but not limited to, silicon, titanium, aluminum, and zirconium. Examples of long-chain RF groups include perfluoroalkyl chains and perfluoropolyether chains. Examples of alkoxysilanes having a long-chain RF group include silane coupling agents (SCAs) having a long-chain RF group. Examples of liquid-repellent films include, but not limited to, SCA films and those disclosed in Japanese Patent No. 4424954. In particular, films with water repellency are referred to as "water-repellent film".

The liquid-repellent film may be formed on a conductive film formed on a substrate having nozzles (nozzle plate). Alternatively, the liquid-repellent film may be formed on an underlayer deposited by plasma polymerization of a material for silicone (plasma polymerization silicone (PPSi) film). This underlayer increases the compatibility between the nozzle plate and the liquid-repellent film.

The liquid-repellent film preferably has a thickness of 1 to 30 nm, more preferably 1 to 20 nm, even more preferably 1 to 15 nm. Such a liquid-repellent film tends to make the nozzle surface more liquid-repellent and maintains liquid repellency over a longer period of time because of its relatively slow degradation. In addition, such a liquid-repellent film can be formed more easily and at a lower cost.

Nozzle Plate Cover

A nozzle plate cover is preferably disposed on the nozzle surface so as to at least partially cover the nozzle surface. The nozzle plate cover is intended to provide at least one of the function of holding a plurality of nozzle chips (hereinafter simply referred to as "chips"), which are combined to form the nozzle surface of the recording head, and the function of preventing a recording medium from coming into direct contact with the nozzles when the recording medium rises. The nozzle plate cover at least partially covers the nozzle surface so as to protrude from the nozzle surface in a side view. If the nozzle plate cover is provided, the inorganic-pigment containing ink composition tends to remain at the corner (gap) between the nozzle surface and the nozzle plate cover protruding therefrom. Solidification of the inorganic pigment contained in the remaining inorganic-pigment containing ink composition results in a loose contact between the cap and the nozzle surface, which can cause problems with capping operation. This problem can be particularly noticeable depending on the type of resin contained in the ink composition. Accordingly, the absorbing member containing the impregnation liquid is brought into contact with the corner between the nozzle plate cover and the nozzle surface to remove the inorganic-pigment containing ink composition therefrom. This stabilizes the capping operation.

Figure 6A:
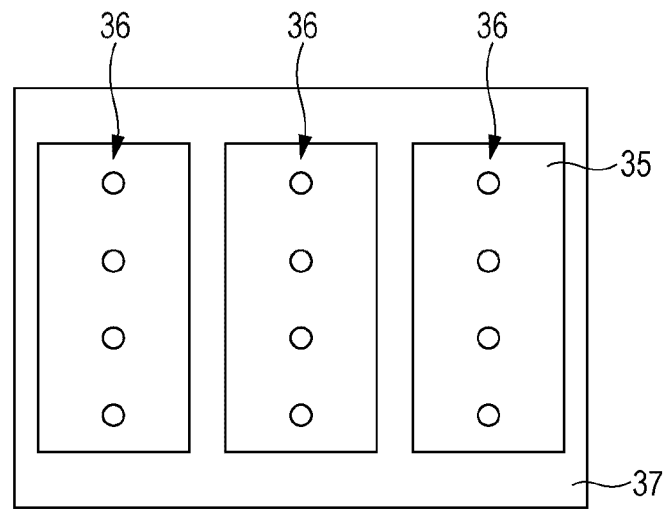
FIGS. 6A and 6B illustrate a nozzle surface.
Figure 6B:
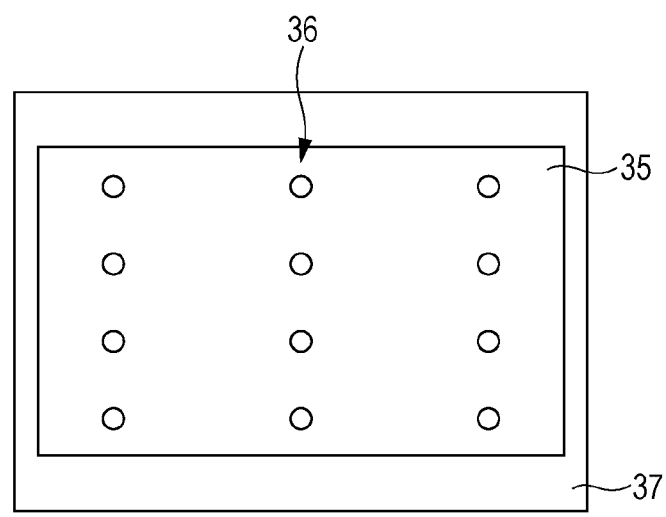

FIGS. 6A and 6B are schematic views of a nozzle surface 37 of the ink-jet recording apparatus according to this embodiment. Examples of patterns in which the nozzle plate cover 35 is provided on the nozzle surface 37 include, but not limited to, a pattern in which the nozzle plate cover 35 is provided around each nozzle row 36 (the nozzle plate cover 35 is also provided between the nozzle rows 36), as shown in FIG. 6A, and a pattern in which the nozzle plate cover 35 is provided around the entire region in which the nozzles are arranged (the nozzle plate cover 35 is not provided between the nozzle rows 36), as shown in FIG. 6B. In FIGS. 6A and 6B, the circles in the nozzle rows 36 represent the nozzles.

1-2. Absorbing Member

The absorbing member according to this embodiment may be any member that can absorb the inorganic-pigment containing ink composition from the nozzle orifices and the nozzle surface and that can contain the impregnation liquid. When the nozzle surface is cleaned, such an absorbing member absorbs the pigment particles and leaves no pigment particles on the surface thereof. This reduces damage to the liquid-repellent film due to the pigment particles.

Examples of absorbing members include, but not limited to, fabrics, sponges, and pulps. In particular, fabrics are preferred because they are flexible and easily wipe ink off the nozzle surface, particularly if the nozzle plate cover is provided. Examples of fabrics include cupra, polyester, polyethylene, polypropylene, lyocell, and rayon. In particular, non-woven fabrics (polyester) and cupra are preferred for the absorbing member because they are resistant to fuzzing so that they absorb less ink from the nozzles and thus cause fewer missing dots.

The absorbing member preferably has a thickness of 0.1 to 3 mm. If the absorbing member has a thickness of 0.1 mm or more, the absorbing member can contain more impregnation liquid. If the absorbing member has a thickness of 3 mm or less, the absorbing member is compact, which contributes to a reduction in the overall size of the cleaning unit and also facilitates mechanical transportation of the cleaning member.

The absorbing member preferably has an area density of 0.005 to 0.15 g/cm$^2$, more preferably 0.02 to 0.13 g/cm$^2$. Such an absorbing member can contain more impregnation liquid. The absorbing member is preferably made of a fabric whose area density and thickness can be easily controlled so that it can contain more impregnation liquid.

Impregnation Liquid

The absorbing member contains an impregnation liquid during the cleaning operation. The impregnation liquid facilitates movement of the pigment particles from the surface of the absorbing member into the interior thereof, leaving fewer pigment particles on the surface of the absorbing member. The impregnation liquid preferably contains a penetrant and a humectant. This facilitates absorption of the pigment particles into the absorbing member. The impregnation liquid may be any liquid that allows the inorganic pigment particles to move from the surface of the absorbing member into the interior thereof. The impregnation liquid may be contained in the absorbing member in advance or may be applied to the absorbing member when the cleaning operation is performed.

The impregnation liquid preferably has a surface tension of 45 mN/m or less, more preferably 35 mN/m or less. A lower surface tension results in a higher permeability of the inorganic pigment into the absorbing member and thus a higher wiping performance. The surface tension may be measured, for example, by the Wilhelmy method at a liquid temperature of 25° C. using a commonly used surface tension meter (e.g., a CBVP-Z surface tension meter available from Kyowa Interface Science Co., Ltd.).

The impregnation liquid is preferably present in an amount of 10% to 200% by mass, more preferably 10% to 120% by mass, even more preferably 30% to 100% by mass, based on 100% by mass of the absorbing member. If the impregnation liquid is present in an amount of 10% by mass or more, the inorganic pigment ink can easily permeate into the absorbing member and thus causes less damage to the liquid-repellent film. If the impregnation liquid is present in an amount of 200% by mass or less, less impregnation liquid remains on the nozzle surface. This results in fewer missing dots due to entry of bubbles into the nozzles together with the impregnation liquid and entry of the impregnation liquid itself into the nozzles.

Examples of other additives (components) that can be contained in the impregnation liquid include, but not limited to, resins, defoamers, surfactants, water, organic solvents, and pH adjusters. These components may be used alone or in combination and may be present in any amount.

If the impregnation liquid contains a defoamer, the defoamer effectively prevents foaming of the impregnation liquid remaining on the nozzle surface after cleaning. In some cases, the impregnation liquid contains a large amount of acidic humectant such as polyethylene glycol or glycerol. In such cases, if the impregnation liquid contains a pH adjuster, the pH adjuster avoids contact of an acidic impregnation liquid with the ink composition (which is typically basic, i.e., pH 7.5 or higher). This prevents the ink composition from shifting to the acid side, thus improving the storage stability of the ink composition.

The humectant that can be contained in the impregnation liquid may be any humectant that can be commonly used with materials such as inks. The humectant is preferably, but not limited to, a high-boiling-point humectant having a boiling point at 1 atmosphere of 180° C. or higher, more preferably 200° C. or higher. A humectant having such a boiling point prevents volatilization of volatile components from the impregnation liquid. This allows the impregnation liquid to reliably contact and wet the inorganic-pigment containing ink composition so that it can be effectively wiped.

Examples of high-boiling-point humectants include, but not limited to, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol, polypropylene glycol, 1,3-propylene glycol, isopropylene glycol, isobutylene glycol, glycerol, meso-erythritol, and pentaerythritol.

These humectants may be used alone or in combination. The humectant is preferably present in an amount of 10% to 100% by mass based on the total mass (100% by mass) of the impregnation liquid. The case where the humectant is present in an amount of 100% by mass based on the total mass of the impregnation liquid means that the impregnation liquid is composed only of the humectant.

Among the additives that can be contained in the impregnation liquid, penetrants will be described. The impregnation liquid may contain any penetrant that can be commonly used with materials such as inks. The penetrant may be a solution containing 90% by mass of water and 10% by mass of a penetrant and having a surface tension of 45 mN/m or less. The penetrant may be, for example, but not limited to, at least one penetrant selected from the group consisting of alkanediols having 5 to 8 carbon atoms, glycol ethers, acetylene glycol surfactants, siloxane surfactants, and fluorinated surfactants. The surface tension may be measured by the method described above.

The penetrant is preferably present in the impregnation liquid in an amount of 1% to 40% by mass, more preferably 3% to 25% by mass. If the penetrant is present in an amount of 1% by mass or more, the impregnation liquid tends to provide a higher wipeability. If the penetrant is present in an amount of 40% by mass or less, the penetrant does not attack the pigment contained in the ink near the nozzles and cause aggregation due to decreased dispersion stability.

Examples of alkanediols having 5 to 8 carbon atoms include, but not limited to, 1,2-pentanediol, 1,5-pentanediol, 1,2-hexanediol, 1,6-hexanediol, 1,2-heptanediol, 2-ethyl-1,3-hexanediol, 2,2-dimethyl-1,3-propanediol, and 2,2-dimethyl-1,3-hexanediol. These alkanediols having 5 to 8 carbon atoms may be used alone or in combination.

Examples of glycol ethers include, but not limited to, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, dipropylene glycol monoisopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether. These glycol ethers may be used alone or in combination.

Examples of acetylene glycol surfactants include, but not limited to, compounds represented by the following formula:

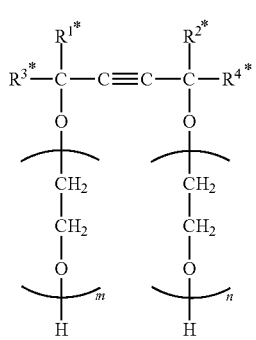

(1)

(where 0≤m+n≤50 and $R^{1*}$, $R^{2*}$, $R^{3*}$, and $R^{4*}$ are each independently an alkyl group (preferably, an alkyl group having 1 to 6 carbon atoms)).

Preferred acetylene glycol surfactants represented by formula (1) include 2,4,7,9-tetramethyl-5-decyne-4,7-diol, 3,6-dimethyl-4-octyne-3,6-diol, and 3,5-dimethyl-1-hexyn-3-ol. Commercial products of acetylene glycol surfactants represented by formula (1) are also available, including Surfynol 82, 104, 440, 465, 485, and TG (all available from Air Products and Chemicals, Inc.) and Olfine STG and Olfine E1010 (trade names, available from Nissin Chemical Industry Co., Ltd.). These acetylene glycol surfactants may be used alone or in combination.

Examples of siloxane surfactants include, but not limited to, compounds represented by the following formula:

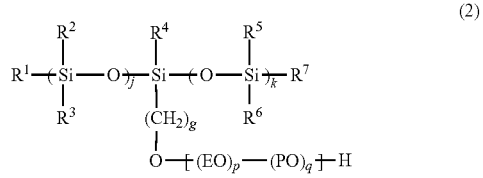

(2)

(where $R^1$, $R^2$, $R^3$, $R^4$, $R^5$, $R^6$, and $R^7$ are each independently an alkyl group having 1 to 6 carbon atoms, preferably methyl; j and k are each independently an integer of 1 or more, preferably 1 to 5, more preferably 1 to 4, even more preferably 1 or 2, where it is preferable to satisfy j=k=1 or k=j+1; g is an integer of 0 or more, preferably 1 to 3, more preferably 1; and p and q are each an integer of 0 or more, preferably 1 to 5, where p+q is an integer of 1 or more, preferably 2 to 4).

Preferred siloxane surfactants represented by formula (2) include compounds where $R^1$ to $R^7$ are all methyl, j is 1 or 2, k is 1 or 2, g is 1 or 2, p is an integer of 1 to 5, and q is 0.

Examples of siloxane surfactants also include compounds represented by the following formula:

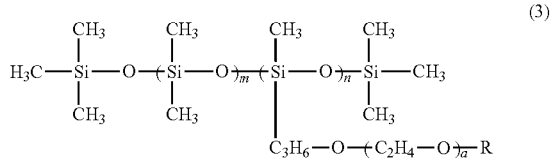

(3)

(where R is hydrogen or methyl, a is an integer of 2 to 18, m is an integer of 0 to 50, and n is an integer of 1 to 5).

Preferred siloxane surfactants represented by formula (3) include, but not limited to, compounds where R is hydrogen or methyl, a is an integer of 7 to 11, m is an integer of 30 to 50, and n is an integer of 3 to 5; compounds where R is hydrogen or methyl, a is an integer of 9 to 13, m is an integer of 2 to 4, and n is an integer of 1 or 2; compounds where R is hydrogen or methyl, a is an integer of 6 to 18, m is 0, and n is 1; and compounds where R is hydrogen, a is an integer of 2 to 5, m is an integer of 20 to 40, and n is an integer of 3 to 5.

Commercially available siloxane surfactants may also be used, including Olfine PD-501 (available from Nissin Chemical Industry Co., Ltd.), Olfine PD-570 (available from Nissin Chemical Industry Co., Ltd.), BYK-347 (available from BYK Japan KK), and BYK-348 (available from BYK Japan KK). The above siloxane surfactants may be used alone or in combination.

As disclosed in WO2010/050618 and WO2011/007888, fluorinated surfactants are known to have good wettability on recoding media that absorb little or no ink. Examples of fluorinated surfactants include, but not limited to, perfluoroalkylsulfonic acid salts, perfluoroalkylcarboxylic acid salts, perfluoroalkylphosphoric acid esters, perfluoroalkyl ethylene oxide adducts, perfluoroalkyl betaines, and perfluoroalkylamine oxides, any of which may be selected depending on the purpose.

Specially synthesized fluorinated surfactants and commercially available fluorinated surfactants may also be used. Examples of commercially available fluorinated surfactants include S-144 and S-145 (available from Asahi Glass Co., Ltd.); FC-170C, FC-430, and FLUORAD FC-4430 (available from Sumitomo 3M Limited); FSO, FSO-100, FSN, FSN-100, and FS-300 (available from Dupont); and FT-250 and FT-251 (available from NEOS Co, Ltd.). Particularly preferred are FSO, FSO-100, FSN, FSN-100, and FS-300 available from Dupont. These fluorinated surfactants may be used alone or in combination.

1-3. Actuating Mechanism

The actuating mechanism according to this embodiment moves at least one of the absorbing member and the recording head relative to the other to perform a cleaning operation in which the ink composition is removed from the nozzle surface with the absorbing member. The actuating mechanism includes a pressing member that presses the absorbing member containing the impregnation liquid and the nozzle surface relative to each other with a force of 50 to 500 gf, preferably 75 to 300 gf. A pressing force of 50 gf or more provides high ink wipeability. In addition, if there is a step between the nozzle plate and the nozzle plate cover, such a pressing force is effective in preventing ink from being deposited in the gap therebetween or removing ink therefrom. A pressing force of 500 gf or less allows a better conservation of the liquid-repellent film. The actuating mechanism may be configured in any manner. For example, the actuating mechanism may be configured to bring the absorbing member into contact with the nozzle surface by pressing the side of the absorbing member facing away from the nozzle surface. Alternatively, the actuating mechanism may be configured to bring the absorbing member into contact with the nozzle surface by actuating the recording head. As used herein, the term "load" refers to the total load applied to the nozzle surface by the entire actuating mechanism.

The actuating mechanism preferably moves the absorbing member and the recording head relative to each other at a speed of 1 to 10 cm/s. Such a speed further improves the cleaning performance and the conservation of the liquid-repellent film. The speed of the cleaning operation is generally, but not limited to, about one fifth to one twentieth the typical speed at which the recording head moves during image recording.

The pressing member is preferably, but not necessarily, covered with, for example, an elastic member. The elastic member preferably has a Shore A hardness of 10 to 60, more preferably 10 to 50. This allows the pressing member and the absorbing member to be bent when pressed so that the absorbing member can be pressed further into a step in the nozzle surface. In particular, if the nozzle plate cover is provided, the absorbing member can be pressed further into the corner (gap) between the nozzle surface and the nozzle plate protruding therefrom for reduced ink build-up. This further improves the cleaning performance.

2. Operation of Apparatus

Figure 2:
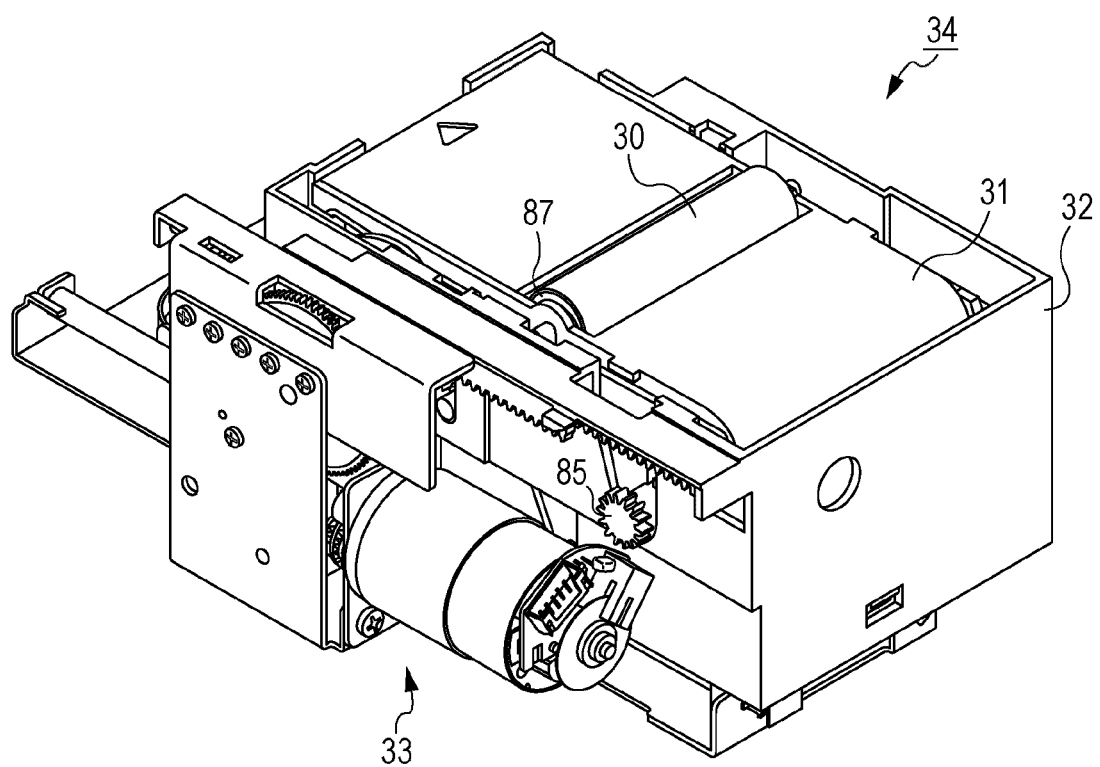
FIG. 2 is a perspective view of a wiper unit.
Figure 3A:
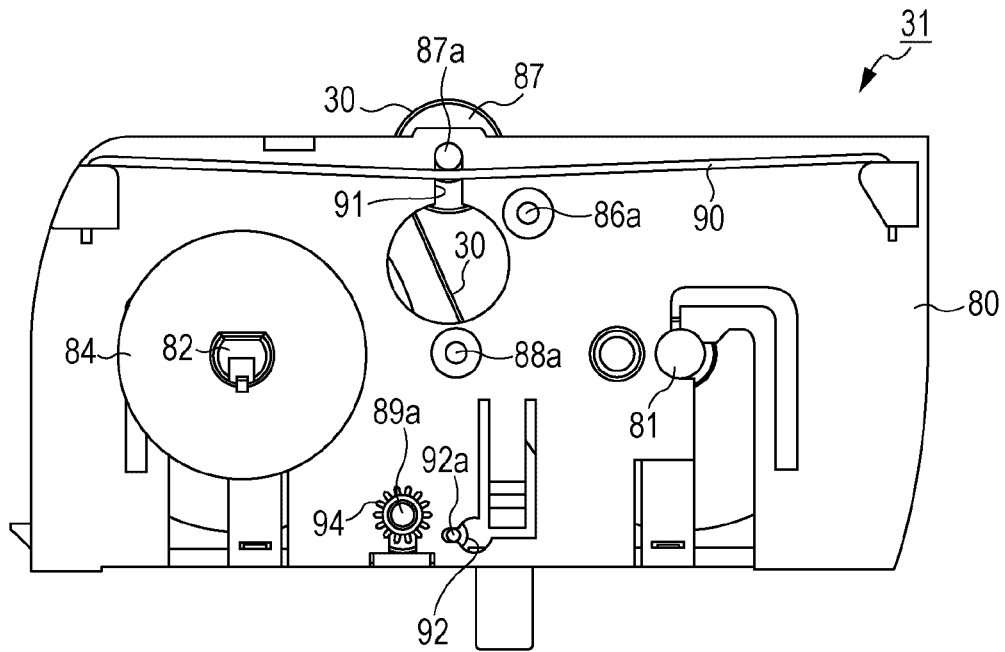
FIG. 3A is a front view of a wiper cassette.
Figure 3B:
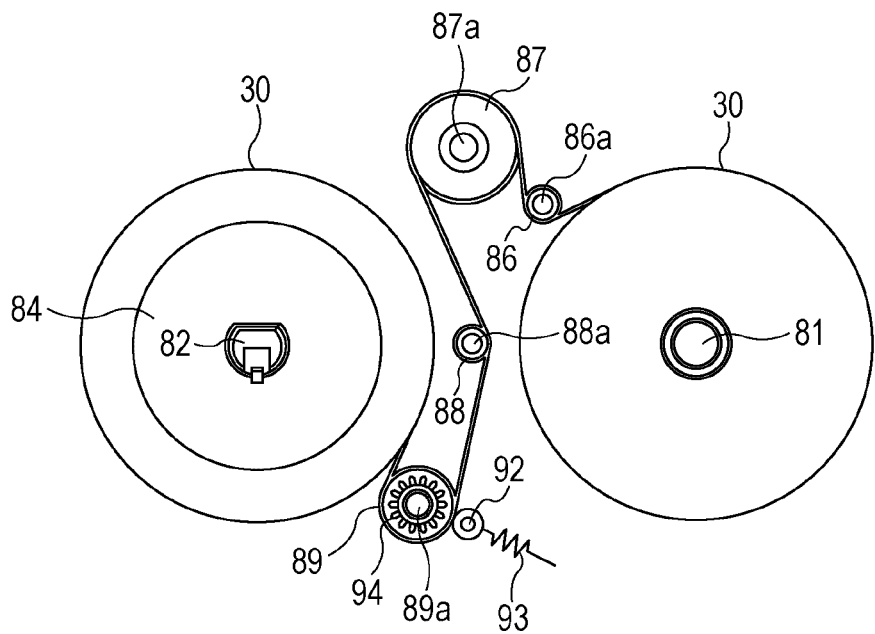
FIG. 3B is a front view of the wiper cassette, with a housing omitted.

FIG. 1 is a perspective view of the ink-jet recording apparatus according to this embodiment. FIG. 2 is a perspective view of a wiper unit. FIG. 3A is a front view of a wiper cassette. FIG. 3B is a front view of the wiper cassette, with a housing omitted. The ink-jet recording apparatus illustrated in FIGS. 1 to 3B is configured as described above. The operation of the ink-jet recording apparatus will now be described in detail. As shown in FIG. 1, a head maintenance device 26 for maintenance of a recording head 22 is disposed at a home position HP to the right of a recording region in which recording paper P is transported in a frame 12.

The head maintenance device 26 includes a wiper unit 34 including a wiper cassette 31 carrying an absorbing member 30 that wipes ink off the nozzle surface of the recording head 22, a wiper holder 32 to which the wiper cassette 31 is removably attached, and a moving mechanism 33 that moves the wiper holder 32 in the nozzle row direction of the recording head 22 (the transport direction of the recording paper P in FIG. 1). In addition to the wiper unit 34, the head maintenance device 26 may include a cap (not shown) that can be brought into contact with the nozzle surface of the recording head 22 so as to cover the nozzles and a suction pump (not shown) that is driven to remove and discharge waste ink, such as thickened ink, from the recording head 22 through the cap. The actuating mechanism according to this embodiment, which presses the absorbing member containing the impregnation liquid against the nozzle surface, includes at least a pressing member 87 and bar springs 90 (see FIG. 3A) and may also include the moving mechanism 33.

As shown in FIGS. 3A and 3B, a substantially rectangular housing 80 forms the exterior of the wiper cassette 31. The housing 80 accommodates a pair of rollers 81 and 82 having the axes thereof extending horizontally in the lateral direction of the housing 80, i.e., the front-to-rear direction. The pair of rollers 81 and 82 are disposed at a distance in the longitudinal direction of the housing 80, i.e., the left-to-right direction. A long absorbing member 30 is entrained about the pair of rollers 81 and 82 to wipe ink off the nozzle surface of the recording head 22. Of the pair of rollers 81 and 82, the roller 81 is a feed roller disposed as a first roller. The feed roller 81 feeds an unused absorbing member 30 wound therearound. The takeup roller 82 collects the absorbing member 30 fed from the feed roller 81 and used for wiping. The feed roller 81 and the takeup roller 82 are located substantially at the same height. A feed gear is disposed at an end (front end) of the feed roller 81 exposed outside the housing 80 in the axial direction so as to be rotatable together with the feed roller 81. Takeup gears 84 and 85 are disposed at both ends of the takeup roller 82 exposed outside the housing 80 in the axial direction so as to be rotatable together with the takeup roller 82.

In the housing 80, a plurality of (in this embodiment, four) rollers 86, 88, 89, and 92 and the pressing member 87 are arranged along the feed path of the absorbing member 30 from the feed roller 81 to the takeup roller 82. The rollers 86, 88, 89, and 92 and the pressing member 87 extend parallel to the feed roller 81 and the takeup roller 82 in the front-to-rear direction and are rotatably supported at both ends in the front-to-rear direction, for example, by bearing portions provided in the sidewalls of the housing 80.

Specifically, the portion of the absorbing member fed from the feed roller 81 is entrained about the pressing member 87, which is disposed to the upper left of the feed roller 81. Shafts 87a at both ends of the pressing member in the axial direction are supported from below by the bar springs 90, which are fixed to the outer surfaces in the front and rear of the housing 80. The bar springs 90 support the shafts 87a of the pressing member 87 from below midway along the length thereof. The shafts 87a of the pressing member 87 are inserted in bearing holes 91 provided in the housing 80 in the front-to-rear direction and are brought into close contact with the upper edges of the bearing holes 91 by an upward biasing force exerted by the bar springs 90. The shafts 87a of the pressing member 87 are rotatably supported from above and below between the bar springs 90 and the edges of the bearing holes 91. The top of the circumferential surface of the pressing member 87 is located above the top surface of the housing 80. The portion of the absorbing member 30 entrained about the pressing member 87 protrudes above the top surface of the housing 80. The top of the circumferential surface of the pressing member 87 is also located above the nozzle surface of the recording head 22.

The actuating mechanism according to this embodiment, which includes at least the bar springs 90 and the pressing member 87, can press the absorbing member 30 containing the impregnation liquid against the nozzle surface with the upward biasing force exerted by the bar springs 90 to apply a pressing load to the nozzle surface. The pressing load in this embodiment is a spring load. The mechanism that applies the pressing load may be any mechanism that can press the absorbing member 30 against the nozzle surface at a certain load. For example, mechanisms other than springs may be used, including rubber. Instead of using such mechanisms, the pressing load may be applied, for example, by electrically controlling a mechanical element.

The roller 89 is a relay roller disposed vertically below the pressing member 87. The portion of the absorbing member 30 fed from the pressing member 87 is entrained about the relay roller 89. The roller 92 is a pinch roller disposed opposite the relay roller 89 with the absorbing member 30 therebetween. The absorbing member 30 is pinched between the relay roller 89 and the pinch roller 92. A spring member 93 acting as a biasing member is disposed between the inner surface of the bottom wall of the housing 80 and the pinch roller 92. The spring member 93 biases the pinch roller 92 toward the relay roller 89.

A relay gear 94 is disposed at an end, exposed outside the sidewall of the housing 80, of a shaft 89*a* at one end of the relay roller 89 in the axial direction so as to be rotatable together with the relay roller 89. Shafts 92*a* at both ends of the pinch roller 92 in the axial direction have the ends thereof exposed outside cutout bearing portions 91 formed when elastic tabs are formed by cutting the sidewalls of the housing 80.

The rollers 86 and 88 are tension rollers that tension the absorbing member 30. The tension roller 86 is disposed between the feed roller 81 and the pressing member 87 along the feed path of the absorbing member 30 from the feed roller 81 to the takeup roller 82. The tension roller 88 is disposed between the pressing member 87 and the relay roller 89 along the feed path of the absorbing member 30 from the feed roller 81 to the takeup roller 82. Shafts 86*a* and 88*a* at both ends of the tension rollers 86 and 88, respectively, in the axial direction have the ends thereof exposed outside circular bearing portions provided in the sidewalls of the housing 80.

Ink Composition

The ink-jet recording apparatus according to this embodiment may be any type of ink-jet recording apparatus having nozzles through which an inorganic-pigment containing ink composition is ejected and may also have nozzles through which an inorganic-pigment-free ink composition is ejected. The additives (components) that are, or can be, contained in the inorganic-pigment containing ink composition and the inorganic-pigment-free ink composition according to this embodiment (hereinafter collectively referred to as "ink composition") will now be described.

1. Colorant

The inorganic-pigment containing ink composition according to this embodiment may be any ink composition that contains an inorganic pigment. The inorganic-pigment-free ink composition may contain a colorant. The colorant is selected from pigments other than inorganic pigments and dyes.

1-1. Pigment

Examples of inorganic pigments include, but not limited to, carbon black, iron oxide, titanium oxide, and silica.

The inorganic pigment contained in the inorganic-pigment containing ink composition preferably has an average particle size of 200 nm or more, more preferably 250 nm or more. The average particle size is preferably up to 4 µm, more preferably up to 2 µm. The inorganic pigment preferably has a Mohs hardness of more than 2.0, more preferably 5 or more. The Mohs hardness is preferably up to 8. Such an inorganic pigment relatively easily damages the liquid-repellent film, thus resulting in poor conservation of the liquid-repellent film in a common ink-jet recording apparatus. However, even if such an inorganic pigment is used, the ink-jet recording apparatus according to this embodiment, configured as described above, allows good conservation of the liquid-repellent film. The use of an organic pigment is less likely to result in poor conservation of the liquid-repellent film than the use of an inorganic pigment because a typical organic pigment has a Mohs hardness of not more than 1.

The inorganic-pigment containing ink composition preferably contains the inorganic pigment in an amount of 20% by mass or less. Particularly, if the inorganic-pigment containing ink composition is a white ink composition, it preferably contains the inorganic pigment in an amount of 5% by mass or more. Such an ink composition has the properties required of an inorganic pigment ink while allowing good conservation of the liquid-repellent film in the ink-jet recording apparatus according to this embodiment.

The Mohs hardness is measured with a Mohs hardness tester. Devised by F. Mohs, the Mohs hardness tester uses ten types of minerals, ranging from soft to hard minerals, that are contained in boxes and that are numbered from 1 to 10 in ascending order of hardness to indicate the order of hardness. The standard minerals are as follows (the numbers indicate hardness): talc (1), gypsum (2), calcite (3), fluorite (4), apatite (5), orthoclase (6), quartz (7), topaz (8), corundum (9), and diamond (10). The hardness can be compared by scratching the surface of a mineral sample of interest with the standard minerals to determine the resistance to scratching (whether the sample is scratched). For example, if the sample scratches calcite, the sample has a hardness of more than 3. If fluorite scratches the sample but the sample does not scratch fluorite, the sample has a hardness of less than 4. In this case, the hardness of the sample is rated as 3 to 4, or 3.5. If the sample and any standard sample slightly scratch each other, the sample has the same hardness rating as the standard sample used. The hardness measured with the Mohs hardness tester is merely an ordinal rank and not an absolute value.

Examples of inorganic pigments having a Mohs hardness of more than 2.0 include, but not limited to, elemental metals such as gold, silver, copper, aluminum, nickel, and zinc; oxides such as cerium oxide, chromium oxide, aluminum oxide, zinc oxide, magnesium oxide, silicon oxide, tin oxide, zirconium oxide, iron oxide, and titanium oxide; sulfates such as calcium sulfate, barium sulfate, and aluminum sulfate; silicates such as calcium silicate and magnesium silicate; nitrides such as boron nitride and titanium nitride; carbides such as silicon carbide, titanium carbide, boron carbide, tungsten carbide, and zirconium carbide; and borides such as zirconium boride and titanium boride. Particularly preferred are aluminum, aluminum oxide, titanium oxide, zinc oxide, zirconium oxide, and silicon oxide, more preferably titanium oxide, silicon oxide, and aluminum oxide. Titanium oxides include rutile-type titanium oxide, which has a Mohs hardness of about 7 to 7.5, and anatase-type titanium oxide, which has a Mohs hardness of about 6.6 to 6. Rutile-type titanium oxide is a preferred crystal system with high whiteness and low manufacturing cost. With rutile-type titanium dioxide, the ink-jet recording apparatus can produce a print with high whiteness at low cost while allowing good conservation of the liquid-repellent film.

Examples of white inorganic pigments include alkaline earth metal sulfates such as barium sulfate; alkaline earth metal carbonates such as calcium carbonate; silicas such as pulverized silica and synthetic silica; metal compounds such as calcium silicate, alumina, hydrated alumina, titanium oxide, and zinc oxide; and other inorganic pigments such as talc and clay. Particularly, titanium oxide is known as a white pigment with suitable opacity, coloring properties, and dispersed particle size.

Examples of organic pigments include, but not limited to, quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Specific examples of organic pigments are as follows.

Examples of pigments used for cyan inks include C.I. Pigment Blue 1, 2, 3, 15, 15:1, 15:2, 15:3, 15:4, 15:6, 15:34, 16, 18, 22, 60, 65, and 66 and C.I. Vat Blue 4 and 60. Particularly preferred is at least one of C.I. Pigment Blue 15:3 and 15:4.

Examples of pigments used for magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264 and C.I. Pigment Violet 19, 23, 32, 33, 36, 38, 43, and 50. Particularly preferred is at least one pigment selected from the group consisting of C.I. Pigment Red 122, C.I. Pigment Red 202, and C.I. Pigment Violet 19.

Examples of pigments used for yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. Particularly preferred is at least one pigment selected from the group consisting of C.I. Pigment Yellow 74, 155, and 213. Examples of pigments used for inks of other colors, such as green and orange, include pigments known in the art.

Pigments other than inorganic pigments preferably have an average particle size of 250 nm or less because such pigments are less likely to clog the nozzles and can be more stably ejected. As used herein, the average particle size is based on volume. The average particle size can be measured, for example, by a laser diffraction/scattering particle size distribution analyzer. The particle size distribution analyzer may be, for example, a dynamic light scattering particle size distribution analyzer (e.g., Microtrac UPA available from Nikkiso Co., Ltd.).

1-2. Dye

In this embodiment, dyes can be used as a colorant. Examples of dyes include, but not limited to, acid dyes, direct dyes, reactive dyes, and basic dyes.

The colorant is preferably present in an amount of 0.4% to 12% by mass, more preferably 2% to 5% by mass, based on the total mass (100% by mass) of the ink composition.

2. Resin

Preferred ink compositions that are suitable for use with the ink-jet recording apparatus according to this embodiment and that contain an inorganic pigment include the following compositions:

(1) An ink composition for ink-jet recording containing a first resin having a heat distortion temperature of 10° C. or lower (hereinafter referred to as "first ink"); and (2) An ink composition for ink-jet recording containing a second resin and substantially no glycerol (hereinafter referred to as "second ink").

These ink compositions have the property of easily solidifying on the nozzle surface and the absorbing member and tend to promote damage to the liquid-repellent film, although this can be effectively prevented by the ink-jet recording apparatus according to this embodiment.

The first ink contains a first resin having a heat distortion temperature of 10° C. or lower. Such a resin has the property of strongly adhering to flexible, absorbent materials such as fabric. The first ink, however, rapidly forms a coating and solidifies, leaving a solid on the nozzle surface and the absorbing member.

The second ink contains substantially no glycerol, which has a boiling point of 290° C. at 1 atmosphere. A colored ink containing glycerol dries considerably slowly, which results in noticeable variations in image density and low ink fixability on various recoding media, particularly recoding media that absorb little or no ink. Because the second ink contains no glycerol, the main solvent in the second ink, such as water, volatilizes rapidly, and the proportion of the organic solvent in the second ink increases accordingly. This lowers the heat distortion temperature (particularly, the thickening temperature) of the resin and thus promotes solidification of the coating. The second ink preferably contains substantially no alkylpolyol (excluding glycerol) having a boiling point at 1 atmosphere of 280° C. or higher. In a recording apparatus including a heater that heats a recording medium transported to a position opposite the recording head, the second ink dries rapidly near the recording head. Although this could result in more noticeable problems, they can be effectively prevented by the ink-jet recording apparatus according to this embodiment. A heating temperature of 30° C. to 80° C. is preferred for high ink storage stability and recording image quality. The heater may be any type of heater, such as a heat-generating heater, a hot-air heater, or an infrared heater.

As used herein, the phrase "substantially no" means that glycerol is not present in an amount sufficient to make it worthwhile to add glycerol. Quantitatively, glycerol is preferably not present in an amount of 1.0% by mass or more, more preferably 0.5% by mass or more, even more preferably 0.1% by mass or more, yet even more preferably 0.05% by mass or more, further preferably 0.01% by mass or more, most preferably 0.001% by mass or more, based on the total mass (100% by mass) of the colored ink.

The first resin has a heat distortion temperature of 10° C. or lower, preferably −10° C. or lower, more preferably −15° C. or lower. A resin having such a heat distortion temperature provides a higher pigment fixability and thus a higher abrasion resistance on recording media. The heat distortion temperature is preferably, but not limited to, −50° C. or higher.

The second resin preferably has a heat distortion temperature of 40° C. or higher, more preferably 60° C. or higher. A resin having such a heat distortion temperature is less likely to clog the head and provides a higher abrasion resistance on recording media. The heat distortion temperature is preferably up to 100° C.

As used herein, the term "heat distortion temperature" refers to a temperature value represented as glass transition temperature (Tg) or minimum film-forming temperature (MFT). That is, "heat distortion temperature of 40° C. or higher" refers to a Tg or MFT of 40° C. or higher. Preferably, the heat distortion temperature is a temperature value represented as MFT because the redispersibility of the resin can be more easily evaluated based on MFT than based on Tg. An ink composition containing a resin with good redispersibility does not solidify and is therefore less likely to clog the head.

As used herein, Tg is measured by differential scanning calorimetry. As used herein, MFT is measured in accordance with ISO 2115:1996 (entitled "Plastics—Polymer dispersions—Determination of white point temperature and minimum film-forming temperature").

Examples of resins include, but not limited to, poly(meth) acrylic polymers such as poly(meth)acrylic acid esters and copolymers thereof, polyacrylonitrile and copolymers thereof, polycyanoacrylates, polyacrylamide, and poly(meth) acrylic acid; polyolefins such as polyethylene, polypropylene, polybutene, polyisobutylene, polystyrene, copolymers thereof, petroleum resin, cumarone-indene resin, and terpene resin; vinyl acetate and vinyl alcohol polymers such as polyvinyl acetate and copolymers thereof, polyvinyl alcohol, polyvinyl acetal, and polyvinyl ether; halogen-containing polymers such as polyvinyl chloride and copolymers thereof, polyvinylidene chloride, fluorocarbon resins, and fluorocarbon rubbers; nitrogen-containing vinyl polymers such as polyvinylcarbazole, polyvinylpyrrolidone and copolymers thereof, polyvinylpyridine, and polyvinylimidazole; diene polymers such as polybutadiene and copolymers thereof, polychloroprene, and polyisoprene (butyl rubber); and other resins such as ring-opening polymer resins, condensation polymer resins, and natural polymer resins.

Examples of commercial products of resins include HYTEC E-7025P, HYTEC E-2213, HYTEC E-9460, HYTEC E-9015, HYTEC E-4A, HYTEC E-5403P, and HYTEC E-8237 (all trade names, available from TOHO Chemical Industry Co., Ltd.); AQUACER 507, AQUACER 515, and AQUACER 840 (all trade names, available from BYK Japan KK); and JONCRYL 67, 611, 678, 680, and 690 (all trade names, available from BASF AG).

Anionic, nonionic, and cationic resins may all be used. In particular, nonionic and anionic resins are preferred because they are suitable for use with the head. These resins may be used alone or in combination.

The resin is preferably present in an amount of 1% to 30% by mass, more preferably 1% to 5% by mass, based on the total mass (100% by mass) of the ink composition. Such an ink composition forms an image with a higher gloss and abrasion resistance.

Examples of resins that can be contained in the ink composition include resin dispersants, resin emulsions, and waxes. In particular, emulsions are preferred because they provide high adhesion and abrasion resistance.

2-1. Resin Dispersant

The ink composition according to this embodiment may contain a resin dispersant so that the pigment contained therein can be stably dispersed in water. If the ink composition contains a pigment dispersed with a resin dispersant such as a water-soluble resin or a water-dispersible resin (hereinafter referred to as "resin-dispersed pigment"), the resin dispersant improves at least one of the adhesion between the ink composition and a recording medium and the adhesion between solids in the ink composition when the ink composition is deposited on the recording medium. In particular, water-soluble resins are preferred because they provide high dispersion stability.

2-2. Resin Emulsion

The ink composition according to this embodiment preferably contains a resin emulsion. The resin emulsion forms a resin coating that has the effect of sufficiently fixing the ink composition to a recording medium to form an image with high abrasion resistance. This effect allows a print produced with the ink composition containing the resin emulsion to have high adhesion and abrasion resistance, particularly on recording media that absorb little or no ink, such as fabric. Although the resin emulsion tends to promote solidification of the inorganic pigment, problems due to solidification can be effectively prevented by the ink-jet recording apparatus according to this embodiment.

A resin acting as a binder is preferably added in the form of an emulsion to the ink composition. If a resin acting as a binder is added in the form of an emulsion to the ink composition, the viscosity of the ink composition can be easily controlled to the range suitable for ink-jet recording, and the ink composition has high storage stability and ejection stability.

Examples of resin emulsions include, but not limited to, homopolymers and copolymers of (meth)acrylic acid, (meth) acrylic acid esters, acrylonitrile, cyanoacrylates, acrylamide, olefins, styrene, vinyl acetate, vinyl chloride, vinyl alcohol, vinyl ether, vinylpyrrolidone, vinylpyridine, vinylcarbazole, vinylimidazole, and vinylidene chloride; fluorocarbon resins; and natural resins. Particularly preferred is at least one of a (meth)acrylic resin and a styrene-(meth)acrylic acid copolymer resin, more preferably at least one of an acrylic resin and a styrene-acrylic acid copolymer resin, even more preferably a styrene-acrylic acid copolymer resin. The above copolymers may be any of a random copolymer, a block copolymer, an alternating copolymer, and a graft copolymer.

Commercial products of resin emulsions are also available. Alternatively, a resin emulsion may be prepared, for example, by emulsification polymerization as follows. Specifically, the resin for the ink composition may be prepared in the form of an emulsion by emulsification polymerization of a monomer of a water-soluble resin as illustrated above in water in the presence of a polymerization catalyst and an emulsifier. The polymerization initiator, emulsifier, and molecular weight modifier used for emulsification polymerization may be similar to those used in methods known in the art.

The resin emulsion preferably have an average particle size of 5 to 400 nm, more preferably 20 to 300 nm. Such a resin emulsion provides a higher ink storage stability and ejection stability.

The above resin emulsions may be used alone or in combination. The resin emulsion is preferably present in an amount of 0.5% to 15% by mass based on the total mass (100% by mass) of the ink composition. Such an ink composition has a lower solids content and thus has a higher ejection stability.

2-3. Wax

The ink composition according to this embodiment may contain a wax. An ink composition containing a wax has a higher fixability on recording media that absorb little or no ink. Particularly preferred are emulsion waxes and suspension waxes. Examples of waxes include, but not limited to, polyethylene wax, paraffin wax, and polypropylene wax, preferably polyethylene wax, described below.

An ink composition containing polyethylene wax has high abrasion resistance.

The polyethylene wax preferably has an average particle size of 5 to 400 nm, more preferably 50 to 200 nm. Such a polyethylene wax provides a higher ink storage stability and ejection stability.

The polyethylene wax is preferably present in an amount of 0.1% to 3% by mass (on a solids basis), more preferably 0.3% to 3% by mass, even more preferably 0.3% to 1.5% by mass, based on the total mass (100% by mass) of the ink composition. Such an ink composition can be effectively solidified and fixed to a recording medium and also has a higher ink storage stability and ejection stability.

3. Defoamer

The ink composition according to this embodiment may contain a defoamer. Specifically, at least one of the ink composition and the impregnation liquid according to this embodiment preferably contains a defoamer. If the ink composition contains a defoamer, it prevents foaming and thereby prevents entry of bubbles into the nozzles.

Examples of defoamers include, but not limited to, silicone defoamers, polyether defoamers, fatty acid ester defoamers, and acetylene glycol defoamers. In particular, silicone defoamers and acetylene glycol defoamers are preferred because they are effective in maintaining proper surface tension and interfacial tension and form few bubbles. The defoamer preferably has an HLB value based on Griffin's method of 5 or less.

4. Surfactant

The ink composition according to this embodiment may contain a surfactant (other than the defoamers illustrated above, i.e., having an HLB value based on Griffin's method of more than 5). Examples of surfactants include, but not limited to, nonionic surfactants. Nonionic surfactants have the property of uniformly spreading ink over a recording medium. Thus, ink-jet recording using an ink containing a nonionic surfactant allows the formation of a high-resolution image with little bleeding. Examples of nonionic surfactants include, but not limited to, silicone surfactants, polyoxyethylene alkyl ether surfactants, polyoxypropylene alkyl ether surfactants, polycyclic phenyl ether surfactants, sorbitan derivatives, and fluorinated surfactants, preferably silicone surfactants.

Silicone surfactants are more effective in uniformly spreading ink over a recording medium without bleeding than other nonionic surfactants.

Examples of silicone surfactants include, but not limited to, polysiloxanes. Examples of polysiloxanes include, but not limited to, polyether-modified organosiloxanes. Examples of commercial products of polyether-modified organosiloxanes include, but not limited to, BYK-306, BYK-307, BYK-333, BYK-341, BYK-345, BYK-346, BYK-348, and BYK-349 (trade names, available from BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, available from Shin-Etsu Chemical Co., Ltd.).

These surfactants may be used alone or in combination. The surfactant is preferably present in an amount of 0.1% to 3% by mass based on the total mass (100% by mass) of the ink composition. Such an ink composition has a higher ink storage stability and ejection stability.

5. Water

The ink composition according to this embodiment may contain water. If the ink composition is a water-based ink, water is the main solvent and evaporates when a recording medium is heated during ink-jet recording.

Examples of water include pure or ultrapure deionized water such as ion exchange water, ultrafiltration water, reverse osmosis water, and distilled water. The use of water sterilized, for example, by ultraviolet irradiation or the addition of hydrogen peroxide prevents growth of mold and bacteria during the storage of a pigment dispersion or an ink containing a pigment dispersion for an extended period of time.

Water may be present in any suitable amount.

6. Organic Solvent

The ink composition according to this embodiment may contain a volatile water-soluble organic solvent. Examples of organic solvents include, but not limited to, alcohols and glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, dipropylene glycol monoisopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, and tert-pentanol; and other organic solvents such as N,N-dimethylformamide, N,N-dimethylacetoamide, 2-pyrrolidone, N-imidazolidinone, dimethyl sulfoxide, sulfolane, and 1,1,3,3-tetramethylurea.

These organic solvents may be used alone or in combination. The organic solvent may be present in any suitable amount.

7. pH Adjuster

The ink composition according to this embodiment may contain a pH adjuster. Examples of pH adjusters include inorganic alkalis such as sodium hydroxide and potassium hydroxide, ammonia, diethanolamine, triethanolamine, triisopropanolamine, morpholine, potassium dihydrogen phosphate, and disodium hydrogen phosphate.

These pH adjusters may be used alone or in combination. The pH adjuster may be present in any suitable amount.

8. Other Components

In addition to the above components, the ink composition according to this embodiment may contain materials such as preservatives, fungicides, rust inhibitors, and chelating agents.

9. Method for Manufacturing Ink Composition

The ink composition according to this embodiment can be manufactured by mixing the components (materials) described above together in any order, optionally followed by the removal of impurities, for example, by filtration. For ease of handling, the pigment is preferably uniformly dispersed in a solvent before mixing.

The materials are preferably mixed together by sequentially adding the materials to a container equipped with a stirrer, such as a mechanical stirrer or a magnetic stirrer, and stirring the mixture. The resulting mixture may optionally be filtered, for example, by centrifugation or through a filter.

10. Surface Tension of Ink Composition

The surface tension of the ink composition is preferably, but not limited to, 15 to 35 mN/m. This ensures sufficient permeability of the ink composition into the absorbing member and sufficient resistance to bleeding upon recording and thus improves the ink wipeability during the cleaning operation. The surface tension, as described above, may be measured using a commonly used surface tension meter (e.g., a CBVP-Z surface tension meter available from Kyowa Interface Science Co., Ltd.). The difference in surface tension between the ink composition and the impregnation liquid is preferably 10 mN/m or less. This prevents an extreme decrease in the surface tension of the ink composition when the ink composition is mixed with the impregnation liquid near the nozzles.

EXAMPLES

The invention is further illustrated by the following examples and comparative examples, although these examples are not intended to limit the invention.

1. Materials for Ink Composition

The main materials for the ink compositions used in the examples and comparative examples below are as follows:

Colorants: C.I. Pigment Black 7 (carbon black with an average particle size of 100 nm and a Mohs hardness of 1 to 2), C.I. Pigment Blue 15:3 (with an average particle size of 100 nm and a Mohs hardness of 1 or less), C.I. Pigment Red 122 (with an average particle size of 120 nm and a Mohs hardness of 1 or less), C.I. Pigment Yellow 155 (with an average particle size of 200 nm and a Mohs hardness of 1 or less), and titanium dioxide (with an average particle size of 350 nm and a Mohs hardness of 7.2)

Organic solvents: 1,2-hexanediol, 2-pyrrolidone, and propylene glycol

Resin emulsion: styrene-acrylic acid copolymer resin emulsion (with a Tg of 85° C. and an average particle size of 140 nm)

Polyethylene wax: AQUACER 515 (trade name, available from BYK Japan KK)

Silicone surfactant: BYK 348 (trade name, available from BYK Japan KK)

Acetylene glycol defoamer: Surfynol DF110D (trade name, available from Nissin Chemical Industry Co., Ltd., HLB=3)

pH adjuster: triethanolamine

The average particle size was measured by a Microtrac UPA available from Nikkiso Co., Ltd. The Tg was measured by a DSC-6200R available from SII NanoTechnology Inc. using a sample prepared by drying the emulsion.

2. Preparation of Pigment Dispersion for Ink Composition

To a mixture of 7 parts by mass of potassium hydroxide, 23 parts by mass of water, and 30 parts by mass of triethylene glycol mono-n-butyl ether was added 40 parts by mass of a water-soluble resin (copolymer of methacrylic acid, butyl acrylate, styrene, and hydroxyethyl acrylate in a mass ratio of 25:50:15:10 with a weight average molecular weight of 12,000). The mixture was heated at 80° C. with stirring to prepare an aqueous resin solution.

Then, 3.0 kg of a colorant and 10.25 kg of water were added to and premixed with 1.75 kg of the aqueous resin solution (43% solids) with stirring by an agitator to obtain a mixed solution. The mixed solution was dispersed by passing it multiple times through a horizontal bead mill equipped with a multi-disk impeller, having an effective volume of 1.5 L, and charged with 85% of 0.5 mm zirconia beads. Specifically, the mixed solution was dispersed by passing it twice through the bead mill at a bead speed of 8 m/s and a discharge rate of 30 L/h to obtain a pigment-dispersed mixed solution having an average particle size of 325 nm. The pigment-dispersed mixed solution was then subjected to circulation dispersion in a horizontal annular bead mill having an effective volume of 1.5 L and charged with 95% of 0.05 mm zirconia beads. Specifically, 10 kg of the pigment-dispersed mixed solution was dispersed using a 0.015 mm screen at a bead speed of 10 m/s and a circulation rate of 300 L/h for 4 hours to obtain a water-based pigment dispersion containing 20% of the colorant solids and 5% of the water-soluble resin.

3. Preparation of Ink Composition

The resulting pigment dispersions were weighed such that the colorant was to be present in an amount of 2.5% by mass. To the pigment dispersions, the components other than the colorants shown in Table 1 below were added in the amounts (% by mass) shown in Table 1 below (100.0% by mass in total) to prepare inorganic-pigment containing ink compositions (Bk and W) and inorganic-pigment-free ink compositions (C, M, and Y). Each ink composition was prepared by placing the individual components in a container, stirring the mixture with a magnetic stirrer for 2 hours, and filtering the mixture through a membrane filter with a pore size of 5 μm to remove foreign matter (impurities) such as dust and coarse particles. The water-soluble resin was present in the ink compositions in an amount equal to one fourth the amount of colorant.

TABLE 1

| Type of material | Name of Material | Bk | C | M | Y | W |
|---|---|---|---|---|---|---|
| Pigment | Carbon black | 2.5 | | | | |
| | PB15:3 | | 2.5 | | | |
| | PR122 | | | 2.5 | | |
| | PY155 | | | | 2.5 | |
| | Titanium dioxide | | | | | 10 |
| Organic solvent | 1,2-Hexanediol | 5 | 5 | 5 | 5 | 5 |
| | 2-Pyrrolidone | 15 | 15 | 15 | 15 | 15 |
| | Propylene glycol | 10 | 10 | 10 | 10 | 10 |
| Resin | Resin emulsion | 1 | 1 | 1 | 1 | 1 |
| | Polyethylene wax | 0.5 | 0.5 | 0.5 | 0.5 | 0.5 |
| Surfactant | Silicone surfactant | 0.5 | 0.5 | 0.5 | 0.5 | 0.5 |
| Defoamer | Acetylene glycol defoamer | 0.2 | 0.2 | 0.2 | 0.2 | 0.2 |
| pH adjuster | Triethanolamine | 0.2 | 0.2 | 0.2 | 0.2 | 0.2 |
| Water | Pure water | Balance | Balance | Balance | Balance | Balance |
| Total | | 100 | 100 | 100 | 100 | 100 |

4. Materials for Impregnation Liquid

The main materials for the impregnation liquid used in the examples and comparative examples below are as follows:

Penetrant: acetylene glycol surfactant (Olfine E1010 available from Nissin Chemical Industry Co., Ltd.)

Humectant: polyethylene glycol (with a weight average molecular weight of 200)

5. Preparation of Impregnation Liquid

The components shown in Table 2 below were mixed in the amounts (% by mass) shown in Table 2 below (100.0% by mass in total) to prepare an impregnation liquid. The impregnation liquid was prepared by placing the individual components in a container, stirring the mixture with a magnetic stirrer for 2 hours, and filtering the mixture through a membrane filter with a pore size of 5 μm to remove foreign matter (impurities) such as dust and coarse particles.

TABLE 2

| Type of material | Name of material | Content (% by mass) |
|---|---|---|
| Penetrant | Acetylene glycol surfactant | 10 |
| Humectant | Polyethylene glycol (with weight average molecular weight of 200) | 90 |

6. Ink-Jet Recording

A modified PX-H10000 printer (available from Seiko Epson Corporation) was used (hereinafter referred to as "modified PX-H10000"). The printer was modified by mounting a print head including a silicon nozzle plate with a liquid-repellent film and a nozzle plate cover as shown in FIG. 6A, an absorbing member, an elastic member, and an actuating mechanism.

The silicon nozzle plate was made of single-crystal silicon. A silicon oxide film ($SiO_2$ film) was deposited on the nozzle surface of the silicon nozzle plate by chemical vapor deposition (CVD), in which $SiCl_4$ and steam were introduced into a CVD reactor. The $SiO_2$ film had a thickness of 50 nm. Following oxygen plasma treatment, a liquid-repellent film (with a thickness of 10 nm) was deposited on the $SiO_2$ film by CVD using $C_8F_{17}C_2H_4SiCl_3$ to fabricate a silicon nozzle plate with a liquid-repellent film.

The absorbing member was made of nonwoven cupra (with a density of 0.01 ($g/cm^2$) and a thickness of 0.4 mm). The elastic member was a roller with a Shore A hardness of 30. The Shore A hardness was measured by a measurement method in accordance with ATSM D-2240 using a sheet sample prepared by pressing the outer layer of a foam roller or an unfoamed thermoplastic elastomer at a temperature of 200° C. In Comparative Example 4, the absorbing member and the elastic member were replaced with a rubber blade. In the examples and comparative examples, the impregnation liquid was present in an amount of 40% by mass based on 100% by mass of the absorbing member.

The actuating mechanism was configured to bring the absorbing member into contact with the nozzle surface of the recording head by pressing the side of the absorbing member facing away from the nozzle surface with the pressing member therebetween under a predetermined load and to move the absorbing member and the recording head relative to each other to perform a cleaning operation in which the ink composition was removed from the nozzle surface with the absorbing member.

7. Examples 1 to 3 and Comparative Examples 1 to 4

7-1. Cleaning Performance Test

Figure 4:
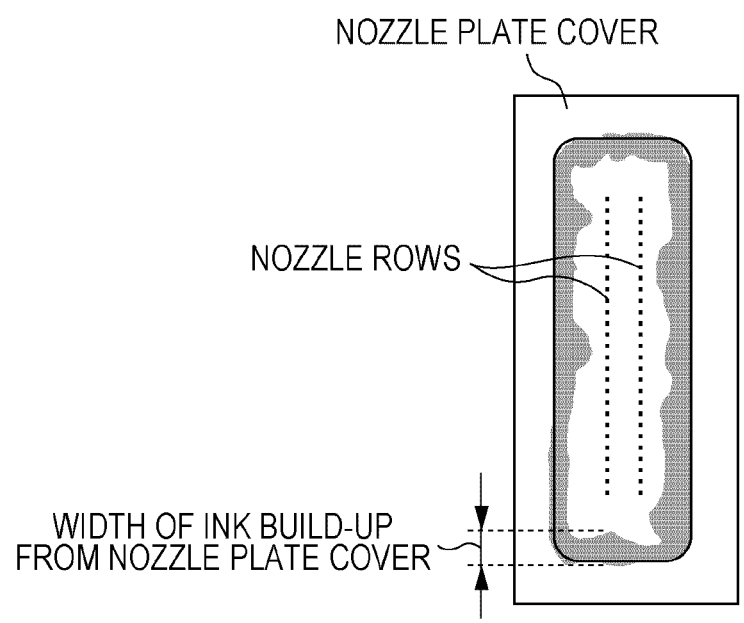
FIG. 4 is a reference view illustrating ink build-up in a cleaning performance test.

The modified PX-H10000 was used to print the ink compositions Bk, C, M, Y, and W shown in Table 1 for 20 minutes, followed by a cleaning operation as shown in Table 3. This cycle was repeated 50 times. Thereafter, the nozzle surface was visually inspected for ink build-up. FIG. 4 is a reference view illustrating ink build-up. The cleaning operation was executed in the direction in which nozzles were arranged in rows. The rows of nozzles for the ink compositions Bk and W, corresponding to a first row of nozzles, and the rows of nozzles for the ink compositions C, M, and Y, corresponding to a second row of nozzles, were simultaneously cleaned.

A: The width of ink build-up was 0.1 mm or less.
B: The width of ink build-up was more than 0.1 mm and not more than 0.3 mm.
C: The width of ink build-up was more than 0.3 mm and not more than 0.6 mm.
D: The width of ink build-up was more than 0.6 mm.

7-2. Liquid-Repellent Film Conservation Test

Figure 5A:
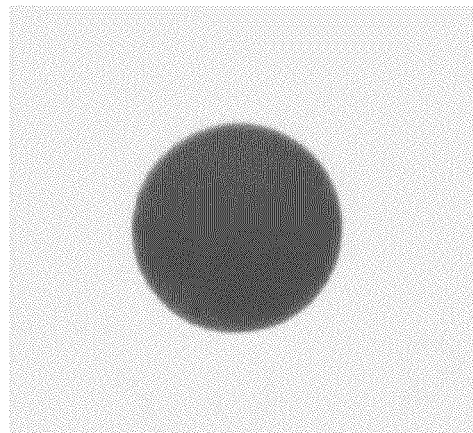
FIGS. 5A to 5C are light micrographs taken in a liquid-repellent film conservation test.
Figure 5B:
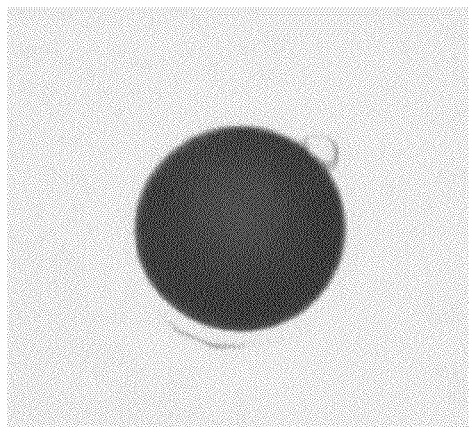
Figure 5C:
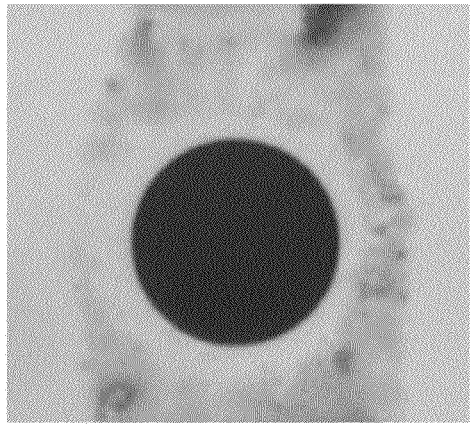

The modified PX-H10000 was used to perform a suction operation in which ink was removed from the head using a suction pump, followed by a cleaning operation as shown in Table 3. This cycle was repeated 12,000 times. Thereafter, the liquid-repellent film was examined near the nozzles under a light microscope (HISOMET-II DH2 high-precision non-contact depth measuring microscope available from Union Optical Co., Ltd.). FIGS. 5A to 5C show light micrographs of liquid-repellent films rated as A, B, and D, respectively. The cleaning operation was executed in the direction in which nozzles were arranged in rows. The rows of nozzles for the ink compositions Bk and W, corresponding to a first row of nozzles, and the rows of nozzles for the ink compositions C, M, and Y, corresponding to a second row of nozzles, were simultaneously cleaned.

A: The liquid-repellent film showed substantially no peeling.
B: The liquid-repellent film peeled slightly and discolored, although it did not affect ejection.
C: The liquid-repellent film peeled at the edges of the nozzles, and it affected ejection.
D: The liquid-repellent film peeled over the entire nozzle surface, and it significantly affected ejection.

TABLE 3

| | Example 1 | Example 2 | Example 3 | Comparative Example 1 | Comparative Example 2 | Comparative Example 3 | Comparative Example 4 |
|---|---|---|---|---|---|---|---|
| Load (gf) | 300 | 150 | 300 | 20 | 1000 | 300 | — |
| Wiping speed (cm/s) | 5 | 5 | 10 | 5 | 5 | 5 | 5 |
| Impregnation liquid | Used | Used | Used | Used | Used | None | None |
| Shore A hardness of elastic member | 30 | 30 | 30 | 30 | 30 | 30 | — |
| Thickness of liquid-repellent film (nm) | 10 | 10 | 10 | 10 | 10 | 10 | 10 |
| Material for nozzle plate | Silicon | Silicon | Silicon | Silicon | Silicon | Silicon | Silicon |
| Absorbing member | Cupra | Cupra | Cupra | Cupra | Cupra | Cupra | Rubber blade |

TABLE 4

| | Example 1 | Example 2 | Example 3 | Comparative Example 1 | Comparative Example 2 | Comparative Example 3 | Comparative Example 4 |
|---|---|---|---|---|---|---|---|
| Cleaning performance (Bk) | A | B | A | C | A | B | D |
| Cleaning performance (C) | A | B | A | C | A | B | D |
| Cleaning performance (M) | A | B | A | C | A | B | D |
| Cleaning performance (Y) | A | B | A | C | A | B | D |
| Cleaning performance (W) | A | B | A | C | A | B | D |
| Conservation of liquid-repellent film (Bk) | B | A | C | A | D | C | A |
| Conservation of liquid-repellent film (C) | A | A | A | A | B | A | A |
| Conservation of liquid-repellent film (M) | A | A | A | A | B | A | A |
| Conservation of liquid-repellent film (Y) | A | A | A | A | B | A | A |
| Conservation of liquid-repellent film (W) | B | A | C | A | D | C | A |

The above results demonstrate that an insufficient load results in low cleaning performance (Comparative Example 1) and that an excessive load results in poor conservation of the liquid-repellent film (Comparative Example 2). The results also demonstrate that the absence of the impregnation liquid results in poor conservation of the liquid-repellent film when an inorganic pigment is used (Comparative Example 3) and that the use of a rubber blade results in extremely low cleaning performance (Comparative Example 4). In contrast, the results revealed that ink-jet recording apparatuses according to embodiments of the invention (Examples 1 to 3) allow both high cleaning performance and good conservation of the liquid-repellent film. The results also demonstrate that it is important to select the appropriate direction in which the cleaning operation is performed because the degradation of the liquid-repellent film near the nozzles (nozzle rows) can be inhibited depending on the direction in which the cleaning operation is performed.

What is claimed is:

1. An ink-jet recording apparatus comprising:
    a recording head having a plurality of nozzles through which an ink composition containing an inorganic pigment is ejected, a nozzle surface having nozzle orifices, and a liquid-repellent film disposed on the nozzle surface;
    an absorbing member that absorbs the ink composition from the nozzle orifices and the nozzle surface; and
    an actuating mechanism including a pressing member that presses the absorbing member and the nozzle surface relative to each other with a force of 50 to 500 gf,
    wherein
    the actuating mechanism moves at least one of the absorbing member and the recording head relative to the other to perform a cleaning operation in which the ink composition is removed from the nozzle surface with the absorbing member,
    the absorbing member has an area density of 0.005 to 0.15 g/cm$^2$ and contains an impregnation liquid during the cleaning operation, and
    the inorganic pigment has an average particle size of 200 nm or more.

2. The ink-jet recording apparatus according to claim 1, wherein the ink composition containing the inorganic pigment further contains a resin emulsion.

3. The ink-jet recording apparatus according to claim 1, wherein the recording head further has a nozzle plate cover disposed on the nozzle surface so as to at least partially cover the nozzle surface.

4. The ink-jet recording apparatus according to claim 1, wherein the actuating mechanism moves at least one of the absorbing member and the recording head relative to the other at a speed of 1 to 10 cm/s.

5. The ink-jet recording apparatus according to claim 1, further comprising an elastic member that covers the pressing member and that has a Shore A hardness of 10 to 60.

6. The ink-jet recording apparatus according to claim 1, wherein
    the nozzle surface has a first row of nozzles through which the ink composition containing the inorganic pigment is ejected and a second row of nozzles through which an ink composition containing a colorant other than the inorganic pigment is ejected, and
    the actuating mechanism moves the absorbing member and the recording head relative to each other in a direction in which the nozzles are arranged.

7. The ink-jet recording apparatus according to claim 1, wherein the liquid-repellent film has a thickness of 1 to 30 nm.

8. The ink-jet recording apparatus according to claim 1, wherein the inorganic pigment has a Mohs hardness of more than 2.0.

9. An ink-jet recording apparatus comprising:
    a recording head having a plurality of nozzles through which an ink composition containing an inorganic pigment is ejected, a nozzle surface having nozzle orifices, and a liquid-repellent film disposed on the nozzle surface;
    an absorbing member that absorbs the ink composition from the nozzle orifices and the nozzle surface; and
    an actuating mechanism including a pressing member that presses the absorbing member and the nozzle surface relative to each other with a force of 50 to 500 gf,
    wherein
    the actuating mechanism moves at least one of the absorbing member and the recording head relative to the other to perform a cleaning operation in which the ink composition is removed from the nozzle surface with the absorbing member,
    the absorbing member contains an impregnation liquid during the cleaning operation,
    the nozzle surface has a first row of nozzles through which the ink composition containing the inorganic pigment is ejected and a second row of nozzles through which an ink composition containing a colorant other than the inorganic pigment is ejected, and the actuating mechanism moves the absorbing member and the recording head relative to each other in a direction in which the nozzles are arranged.

10. The ink-jet recording apparatus according to claim 9, wherein the ink composition containing the inorganic pigment further contains a resin emulsion.

11. The ink-jet recording apparatus according to claim 9, wherein the recording head further has a nozzle plate cover disposed on the nozzle surface so as to at least partially cover the nozzle surface.

12. The ink-jet recording apparatus according to claim 9, wherein the actuating mechanism moves at least one of the absorbing member and the recording head relative to the other at a speed of 1 to 10 cm/s.

13. The ink-jet recording apparatus according to claim 9, further comprising an elastic member that covers the pressing member and that has a Shore A hardness of 10 to 60.

14. The ink-jet recording apparatus according to claim 9, wherein the liquid-repellent film has a thickness of 1 to 30 nm.

15. The ink-jet recording apparatus according to claim 9, wherein the inorganic pigment has an average particle size of 200 nm or more and a Mohs hardness of more than 2.0.

\* \* \* \* \*